(12) United States Patent
Raju et al.

(10) Patent No.: US 11,812,269 B2
(45) Date of Patent: **\*Nov. 7, 2023**

(54) ASSERTING USER, APP, AND DEVICE BINDING IN AN UNMANAGED MOBILE DEVICE

(71) Applicant: Ivanti, Inc., South Jordan, UT (US)

(72) Inventors: Renchi Raju, Belmont, CA (US); Vijay Pawar, Palo Alto, CA (US); Kumara Das Karunakaran, Milpitas, CA (US)

(73) Assignee: Ivanti, Inc., South Jordan, UT (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/528,091

(22) Filed: Nov. 16, 2021

(65) Prior Publication Data

US 2022/0150703 A1 May 12, 2022

Related U.S. Application Data

(63) Continuation of application No. 16/246,239, filed on Jan. 11, 2019, now Pat. No. 11,206,540.

(60) Provisional application No. 62/617,052, filed on Jan. 12, 2018.

(51) Int. Cl.
| | |
|---|---|
| *H04W 12/108* | (2021.01) |
| *H04L 12/46* | (2006.01) |
| *H04L 9/40* | (2022.01) |
| *H04W 12/06* | (2021.01) |
| *H04W 12/37* | (2021.01) |
| *H04W 12/102* | (2021.01) |
| *H04L 67/55* | (2022.01) |
| *H04W 12/03* | (2021.01) |

(52) U.S. Cl.
CPC ....... *H04W 12/108* (2021.01); *H04L 12/4625* (2013.01); *H04L 12/4641* (2013.01); *H04L 63/0272* (2013.01); *H04L 63/08* (2013.01); *H04L 63/10* (2013.01); *H04L 67/55* (2022.05); *H04W 12/06* (2013.01); *H04W 12/102* (2021.01); *H04W 12/37* (2021.01); *H04L 2463/082* (2013.01); *H04W 12/03* (2021.01)

(58) Field of Classification Search
None
See application file for complete search history.

(56) References Cited

U.S. PATENT DOCUMENTS

| | | | |
|---|---|---|---|
| 2012/0002813 A1\* | 1/2012 | Wei | ..................... H04W 12/069 380/270 |
| 2013/0078948 A1 | 3/2013 | Pecen | |
| 2014/0298420 A1 | 10/2014 | Barton et al. | |
| 2015/0286737 A1 | 10/2015 | Cattone | |

(Continued)

*Primary Examiner* — Jeffrey C Pwu
*Assistant Examiner* — Mayasa A. Shaawat
(74) *Attorney, Agent, or Firm* — Van Pelt, Yi & James LLP

(57) ABSTRACT

A request generated by an unmanaged app to access a resource is received from a mobile device. A notification is sent to the mobile device. A device level VPN connection to the mobile device is established. A unique identifier is associated with the device level VPN. App level traffic received via the device level VPN is tagged with the unique identifier. Access to the resource is allowed in response to the request based at least in part on a determination based on the tags that app level traffic from a trusted app and app level traffic from the unmanaged app are associated with the same mobile device.

21 Claims, 5 Drawing Sheets

(56) References Cited

U.S. PATENT DOCUMENTS

2016/0134624 A1* 5/2016 Jacobson .............. H04L 63/168
726/4
2017/0147157 A1 5/2017 Shah et al.
2017/0279803 A1* 9/2017 Desai ...................... H04L 67/02
2017/0293767 A1 10/2017 Barton et al.

* cited by examiner

ASSERTING USER, APP, AND DEVICE BINDING IN AN UNMANAGED MOBILE DEVICE

CROSS REFERENCE TO OTHER APPLICATIONS

This application is a continuation of U.S. patent application Ser. No. 16/246,239, entitled ASSERTING USER, APP, AND DEVICE BINDING IN AN UNMANAGED MOBILE DEVICE filed Jan. 11, 2019 which is incorporated herein by reference for all purposes, which claims priority to U.S. Provisional Application No. 62/617,052, entitled ASSERTING USER, APP, AND DEVICE BINDING IN AN UNMANAGED MOBILE DEVICE filed Jan. 12, 2018 which is incorporated herein by reference for all purposes.

BACKGROUND OF THE INVENTION

An enterprise may use a Mobile App Management (MAM) solution instead of full scale Mobile Device Management (MDM) to provide secure access from mobile devices to enterprise resources (on-premises and/or cloud) to some or all of their employee population, contractors, and/or other users. This could be based on the user's role or the resources they want to access. Proprietary container solutions—like the MOBILEIRON APPCONNECT solution—can be used to provide secure access in scenarios where in-house applications are used to access corporate resources. In cases where public applications are used to access on-premises or cloud based corporate resources (e.g. O365, SALESFORCE, etc.), containerization cannot be used as the app vendors create platform native applications independent of any container technology. So there is no easy way to ensure adequate security posture of the device in such cases.

Some IT admins adopt the use of Multi-Factor Authentication (MFA) to tighten user level authentication as "good enough" security. There are many products in the market which provide this kind of solution. A drawback of this approach is that there is no way to assert the posture of the device where this application is running. Examples of device posture include, without limitation, whether the device has been stolen, is no longer associated with an authorized user, is not in a secure location, and/or is not in a state that complies fully with all enterprise security requirements. Once corporate data reaches this device, there is no way to prevent leaks or misuse—intentionally or unintentionally. Device posture can be assured only by using Mobile Device Management (MDM) or container based MAM technologies with a device based agent—and this is not available for such use cases. Even if you have a device security agent running on the device, there is no easy way for an external component to link the traffic originating from a public application on the same device to allow or deny access based on device posture.

BRIEF DESCRIPTION OF THE DRAWINGS

Various embodiments of the invention are disclosed in the following detailed description and the accompanying drawings.

DETAILED DESCRIPTION

Figure 1:
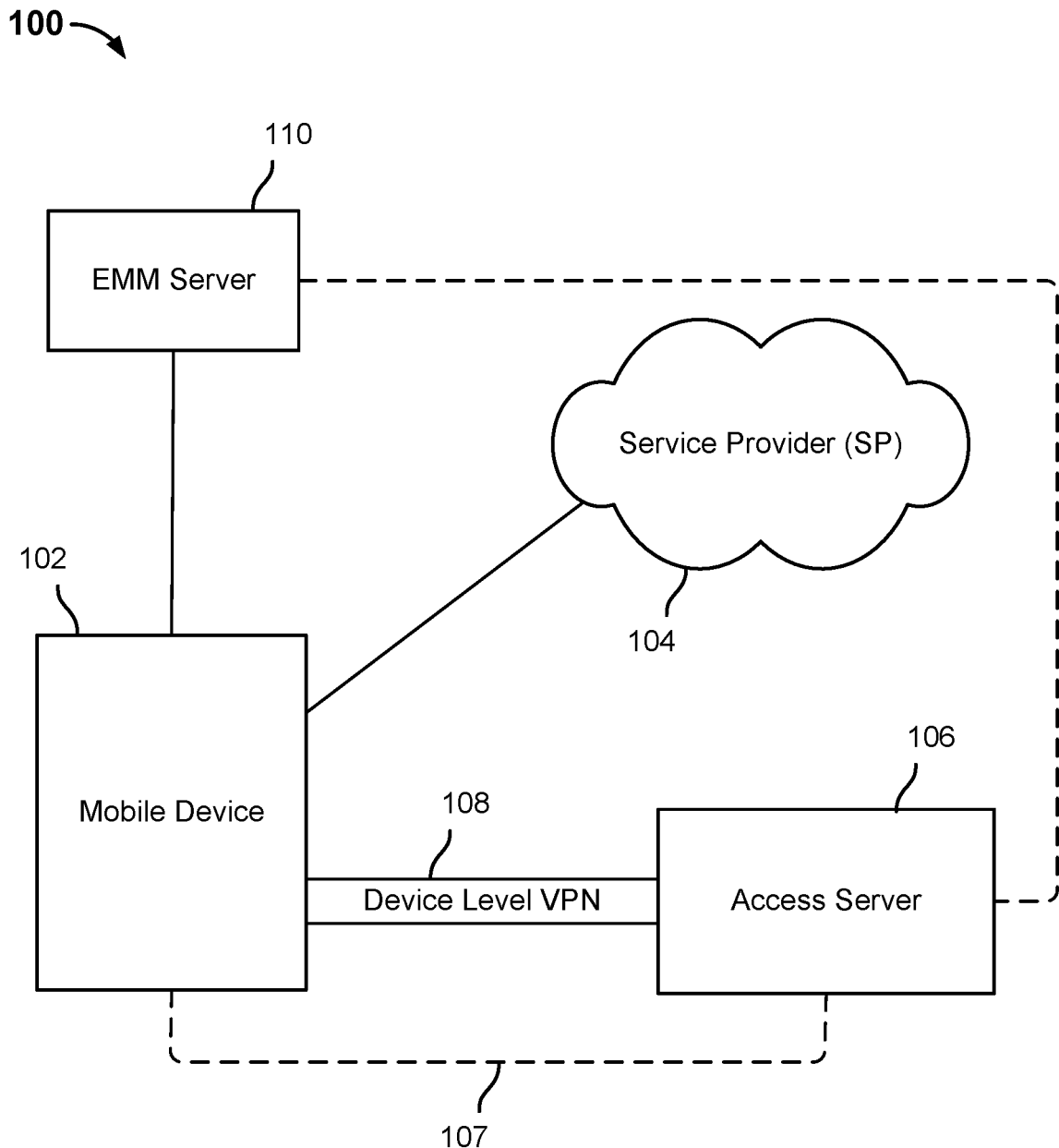
FIG. 1 is a block diagram illustrating an embodiment of a system to manage mobile access to a resource.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to assert user, app, and device binding in an unmanaged device are disclosed. Typically MFA solutions work by sending a notification to a mobile device for the user to approve a login session. In various embodiments, a container solution is integrated into an MFA or other authenticator application to assure device posture prior to allowing access to a requested resource.

In various embodiments, to ensure that an app (e.g., a generic, non-containerized AppStore application) requesting access to a corporate resource is running on the same device where the MFA or other authenticator application is also running, a device level VPN is integrated into the MFA agent. A unique identifier ("unique ID") specific to the device is associated with the device level VPN. App traffic received via the VPN is tagged with the unique ID. Tagged traffic from the MFA or other authenticator app is compared with tagged traffic from the service provider or other app used to request access to the resource. If the tags match and other authentication requirements are completed successfully, access is allowed.

FIG. 1 is a block diagram illustrating an embodiment of a system to manage mobile access to a resource. In the example shown, system 100 includes a mobile device 102 configured to access a resource associated with a service provider (SP) 104, such as a cloud-based or "on premises" service or other resource. For example, the mobile device 102 may have a non-containerized app associated with the service provider installed and running on mobile device 102. A user may have opened the app and requested access to the service provided by SP 104.

In various embodiments, the SP 104 is configured to redirect to access server 106 the request received by SP 104 from mobile device 102. In some embodiments, access server 106 includes an identity provider (IdP) that is federated and/or otherwise associated with the SP 104 and/or an enterprise with which one or more of a user of mobile device 102, mobile device 102, and/or an account or other resource of SP 104 with which the request is associated.

In response to the redirected access request, access server 106 is configured to send a push notification via notification channel/network 107 to an authenticator app on mobile device 102, such as a multi-factor authentication (MFA) app and/or other app or agent associated with access server 106. In response to the push notification, the authenticator (or other trusted) app on mobile device 102 establishes a device level VPN connection 108 between mobile device 102 and access server 106.

In various embodiments, mobile device 102 is configured to route via device level VPN 108 traffic from the authenticator app and at least authentication-related traffic from a third party app (e.g., service provider app) being used to request access to a service or other resource. In various embodiments, the authenticator app on mobile device 102 and access server 106 cooperate to associate a device-specific unique ID with device level VPN 108. Access server 106 is configured to tag app level traffic received via device level VPN 108 with the unique ID. Access server 106 compares the respective tags it has associated with app level traffic received from the authenticator (or other trusted) app and app level traffic received from the third party app being used to request access to the service. If the tags match, access server 106 allows authentication to proceed. If the tags do not match, indicating the requesting app is not associated with the same mobile device as the authenticator app, access is denied and a remediation page is displayed (and/or other responsive action taken).

In the example shown in FIG. 1, mobile device 102 communicates with enterprise mobility management (EMM) server 110. For example, device security posture information may be communicated to EMM service 110 by a mobile access management (MAM) app or other agent on mobile device 102. In various embodiments, the authenticator app/function described above is integrated into the MAM app and/or is associated securely with the MAM app, e.g., via an app containerization solution, such as MOBILEIRON APPCONNECT. In some embodiments, the device level VPN function is integrated into the MAM app.

In some embodiments, the MAM app and/or authenticator app may include, be integrated with, and/or access a mobile threat detection (MTD) app, agent, and/or service configured to detect locally security threats and/or indicators associated with the mobile device 102. For example, the MTD solution may be configured to detect whether the device is jailbroken, infected with a virus or other malware, in an unsecure location, unsecure network, etc.

In some embodiments, EMM server 110 is configured to use information received from mobile device 102 and/or other information to assess and update security posture information associated with mobile device 102. Examples of security posture information include, without limitation, an indication that mobile device 102 has been jailbroken, lost, stolen, and/or otherwise compromised; an indication that malware has been detected on mobile device 102; an indication the mobile device 102 is in a restricted and/or unsecure location; and an indication that a user with whom mobile device 102 is associated is no longer authorized to access enterprise resources.

In various embodiments, one or both of the authenticator app on mobile device 102 and access server 106 may be configured to prevent or allow access to a resource, e.g., SP 104, based at least in part on device security posture information received from EMM server 110. For example, based on security posture information received from EMM server 110, the authenticator app may be configured to NOT establish VPN 108 in response to a push notification from access server 106, e.g., if the security posture information from EMM server 110 and/or local threat detection (MTD) information indicate the mobile device 102 is not in a secure state. In another example, access server 106 may be configured to refuse a request to access SP 104 based at least in part on security posture information from EMM server 110.

Figure 2:
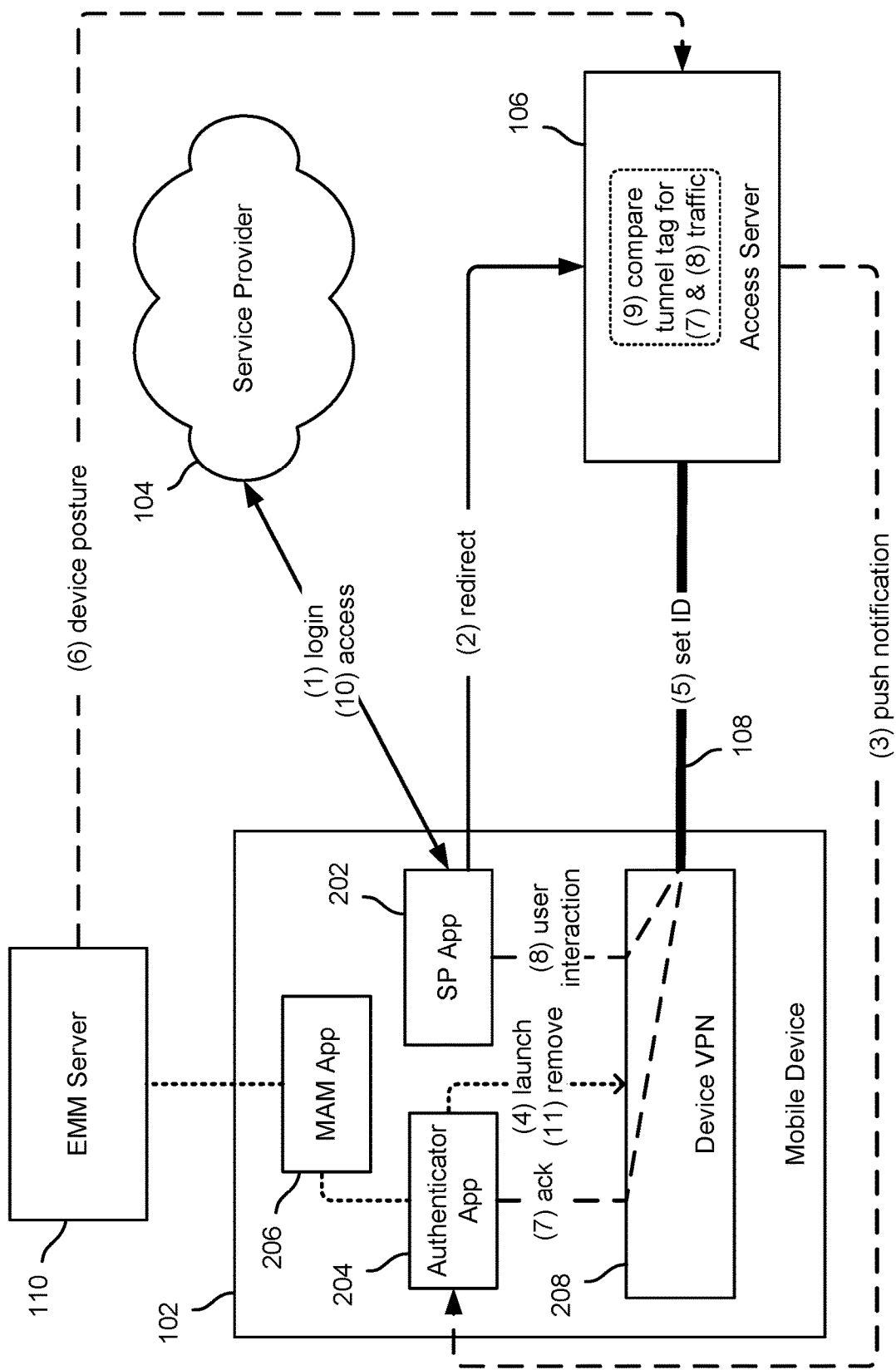
FIG. 2 is a functional flow block diagram illustrating an embodiment of a system to manage mobile access to a resource.

FIG. 2 is a functional flow block diagram illustrating an embodiment of a system to manage mobile access to a resource. In the example shown, mobile device 102 includes a third party (SP) app 202 configured to be used to access SP 104. In addition, mobile device 102 has installed thereon an authenticator app 204 associated with a MAM app/agent 206. For example, authenticator app 204 may be associated via an app containerization solution, such as MOBILEIRON APPCONNECT, with MAM app/agent 206. In some embodiments, authenticator app 204 may be included in MAM app 206, e.g., as a function, module, etc. of MAM app 206. Mobile device 102 includes a device level VPN client 208 associated with device level VPN 108. In various embodiments, device level VPN client 208 may be included in the MAM app 206 or the authenticator app 204, e.g., a function, module, etc.

In the example shown in FIG. 2, the numbered and annotated arrows, e.g., "(1) login", indicate a sequence of actions performed in various embodiments to provide user, app, and/or device binding in an unmanaged mobile device, as disclosed herein. In some embodiments, processing is performed as described in the following numbered subparagraphs, with the subparagraph numbers corresponding to the numbered arrows in FIG. 2. The following describes an implementation in some embodiments on an iOS platform:

1. User opens third party (SP) application 202 (e.g. Salesforce1) and attempts to login to the cloud SP 104 (e.g., salesforce.com).
2. Cloud SP 104 redirects user to access server 106 (e.g., an IdP comprising access server 106) for authentication.
3. Access server 106 triggers MFA by sending a push notification to Authenticator App 204.
4. Authenticator App 204 receives the notification and then starts the device VPN extension, which allows the VPN client 208 to now receive traffic from all the apps on the device. In some embodiments, app traffic is filtered so that only app traffic to access server 106 is sent via the VPN 108.

In some embodiments, instead of a push notification, an iOS Universal Link is presented to the user by the access server through an interaction page (as in step 8 below). Clicking on this link causes iOS to launch the Authenticator App 204, which starts the device VPN extension. Once launched, the flows remain the same as described in step 4 and in the remaining steps below.

5. In the device VPN establishment flow, the authenticator app 204 communicates:
   a. A unique signature for the device 102—this signature can be as simple as a UUID generated by the VPN Client or Access VPN Gateway and linked to the VPN Connection. The signature can be determined by a more extensive fingerprinting mechanism which uses actual device details visible through the platform APIs.
   b. The local device compliance state obtained from the MAM agent 206 (which can include the MTD state as well).
   c. Access server 106 tags the signature of the device 102 with this transient VPN "tunnel" 108 that is established and from that point tags all application level traffic originating from that device 102 to that signature/device.
6. Access server 106 checks with EMM/MTD Server 110 to ensure the mobile device 102 is compliant to all server side policies.
7. Authenticator app 204 communicates with access server 106 through the VPN tunnel 108 and confirms the user's approval/denial of the request to access SP 104.
8. Access server 106 interacts with the user through the third party (SP) app's authentication browser session (e.g., WkWebView in iOS), e.g., to display information, provide feedback that the device is being checked for compliance, etc. In some embodiments, an administrative policy may trigger a request for a One Time Pass (OTP), e.g., as an enhanced security measure.
9. The communication from steps 7 & 8 are compared by access server 106 with the device signature to confirm if they are originating from the same device.
10. If they match, access server 106 allows the third party app 202 to communicate with the Cloud SP 104, or in some embodiments with the enterprise identity provider (IdP) for full authentication. If not, a remediation page is displayed and access is denied.
11. Authenticator app 204 stops the packet provider VPN (208, 108) and allows the third party application 202 to talk directly to SP 104 (i.e., not through VPN 108).

Figure 3:
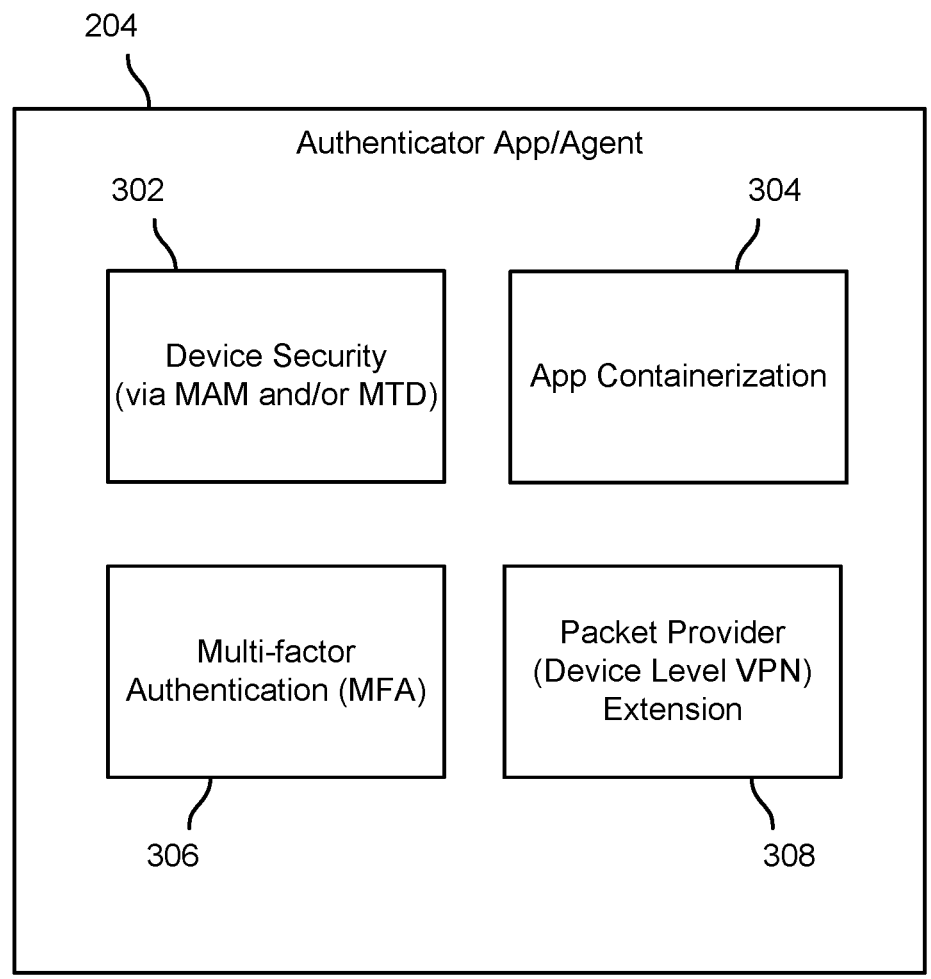
FIG. 3 is a block diagram illustrating an embodiment of an authenticator app to manage access to a resource.

FIG. 3 is a block diagram illustrating an embodiment of an authenticator app to manage access to a resource. In the example shown, authenticator app/agent 204 includes a device security module 302. In various embodiments, device security module 302 includes and/or accesses information from a mobile threat detection (MTD) solution and/or a mobile application management (MAM) app/agent. The MTD information indicates a locally-determined security state of the mobile device, e.g., such as whether it is jailbroken, is infected by malware, is configured as required, etc. The MAM app/agent in various embodiments provides configuration and/or security state information received from an EMM server and/or provides information to an EMM server, directly or through an associated MAM app/agent, to be used to assess security posture at the EMM. In various embodiments, locally-configured security policies may be enforced by the authenticator app/agent 204 based on MTD and/or MAM information. For example, if MTD and/or MAM information indicate the device is not in a compliant state, the authenticator app/agent 204 in some embodiments will not establish and/or permit use of a device level VPN to facilitate authentication and access to a remote service (e.g., SP 104), as described above.

In the example shown, authenticator app/agent 204 includes an app containerization module 304. In various embodiments, containerization module 304 enables the authenticator app/agent 204 to interact securely with one or more managed applications on the device, such as MAM app/agent 202 in the example shown in FIG. 2. In some embodiments, app containerization module 304 comprises and/or is interoperable with the MOBILEIRON APPCONNECT containerization solution.

Authenticator app/agent 204 further includes a multifactor authentication (MFA) module 306. In various embodiments, MFA module 306 responds to a push notification from an access service/server, such as access server 106, to obtain from a user via a graphical user interface confirmation that a request to access a resource using the user's identity and/or credential is authorized by the user. In some embodiments, MFA module 306 responds to the push notification in part by invoking packet provider extension 308. In response, packet provider extension 308 sets up a device level VPN, such as device level VPN 108 of FIGS. 1 and 2, and configures the mobile device to route traffic to the access server via the VPN. In some embodiments, in which an iOS Universal Link is used to display a notification page, instead of a push notification, MFA module 306 comprises a module configured to In the alternate approach, instead (or in addition) to the MFA module, there will be a module to handle Universal Link invocations and respond in the manner described above with respect to the described push notification.

Figure 4:
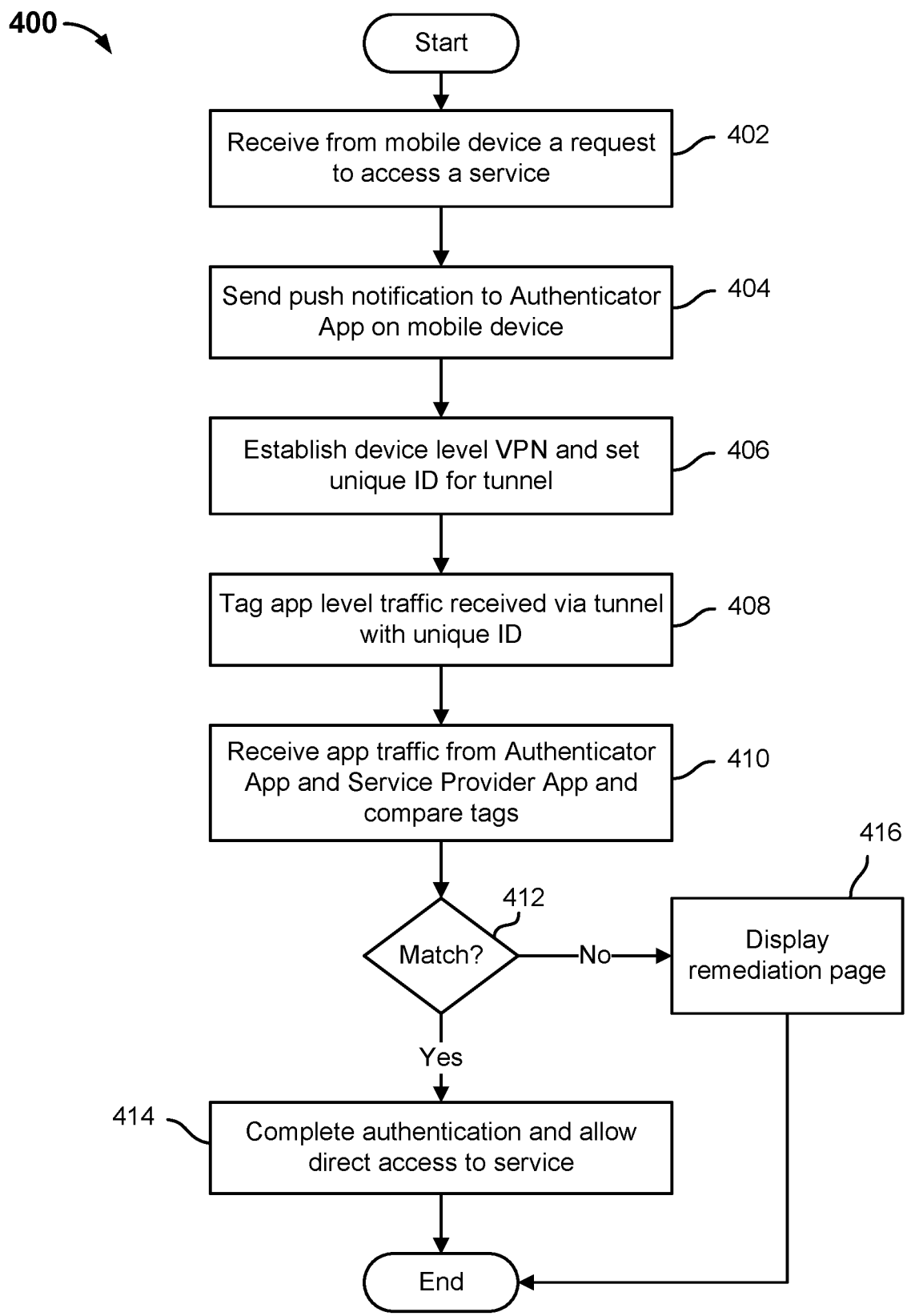
FIG. 4 is a flow chart illustrating an embodiment of a process to manage mobile access to a resource.

FIG. 4 is a flow chart illustrating an embodiment of a process to manage mobile access to a resource. In various embodiments, the process 400 of FIG. 4 is implemented by an access server, such as access server 106 of FIGS. 1 and 2. In the example shown, a request to access a service is received from a mobile device (402). For example, an access request sent to a service provider (e.g., SP 104) using a third party app associated with the service provider (e.g., SP app 202) may have been redirected to an access server implementing the process of FIG. 4. A push notification is sent to an authenticator app associated with the mobile device (404). In an alternative approach, instead of a push notification being sent to the authenticator app, in some embodiments, at step 404 an iOS Universal Link is presented to the user. The user can click on the link from within the third party app, causing iOS to launch the authenticator app, which is registered to handle the link.

A device level VPN is established and a unique ID is determined and set for the VPN tunnel (406). App level traffic received via the device level VPN is tagged with the unique ID (408). App traffic is received from the authenticator app and the SP app and the tags are compared to verify the authenticator app and SP app are on the same mobile device (410). If the tags match (412), authentication is allowed to continue to completion and access to the service is allowed (414). If the tags do not match (412), a remediation page is displayed (416).

Figure 5:
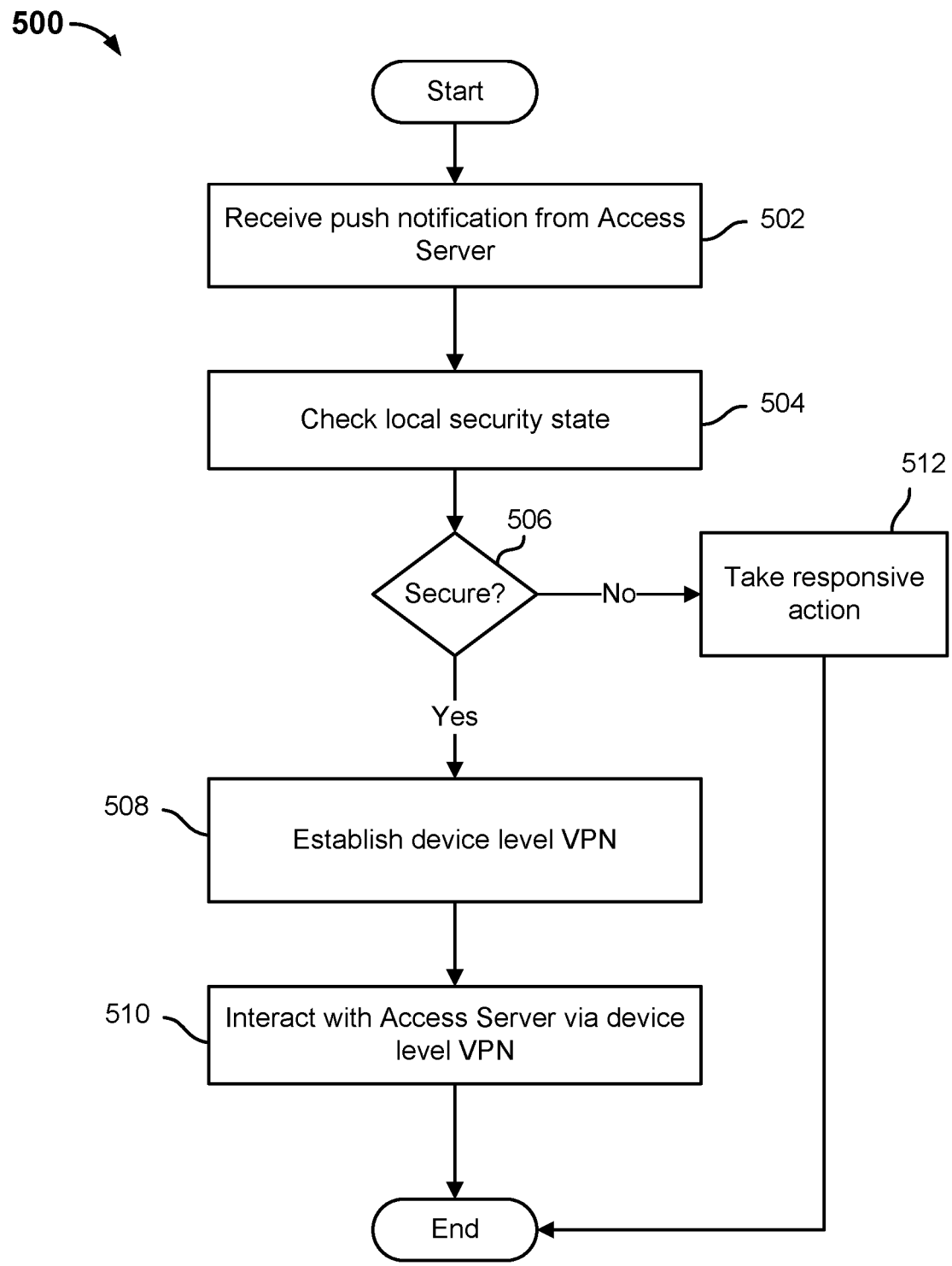
FIG. 5 is a flow chart illustrating an embodiment of a process to manage mobile access to a resource.

FIG. 5 is a flow chart illustrating an embodiment of a process to manage mobile access to a resource. In various embodiments, the process 500 of FIG. 5 is performed by an authenticator app running on a mobile device, such as authenticator app 204 of FIGS. 2 and 3. In the example shown, a push notification is received from an access server (502). (In the alternative approach described above, at step 502 the authenticator app is invoked by iOS to handle the Universal Link invocation by the user.) The locally-indicated security state of the mobile device is checked (e.g., MTD, MAM) (504). If the device is determined to be in a secure state (e.g., local information indicates a state in compliance with local policies) (506), a device level VPN connection to the access server is established (508) and traffic is sent to the access server via the VPN (510). In some embodiments, establishing the device level VPN (508) includes establishing and/or cooperating with the access server to determine a unique ID to be used to associate the VPN tunnel uniquely with the mobile device.

In various embodiments, techniques disclosed herein may be used to provide secure access to a resource from an unmanaged mobile device, e.g., using an unmanaged third party mobile app. In some embodiments, secure access is provided by binding an access request to a user, device, and app, as disclosed herein. In various embodiments, techniques disclosed herein ensure an access request is received from/via an app running on the same mobile device as a trusted app, e.g., an authenticator app as described above, that is associated with a same user as the request. In addition, in various embodiments, device posture (e.g., security, other policy compliance) information may be considered in determining whether to allow access to the resource. In some embodiments, the authenticator app prompts the user to present a device passcode and/or a face ID, fingerprint, or other biometric before establishing the device VPN.

Prior solutions in the MFA, MAM or VPN spaces. An MFA-only solution does not provide adequate assurance of device posture. For example, a user could approve access from an unsecure device and even by another person using the user's login credential. MAM is limited to in-house applications and/or other applications that integrate a shared containerization solution. Solutions that would require all traffic to flow through VPNs are intrusive and require heavy investment and routing traffic via the enterprise or private networks. None of these solutions provide the ease of use for end-user and security for the IT admin. In various embodiments, one or more of MFA, MAM and VPN technologies are combined as disclosed herein to provide a more secure and comprehensive solution that is transparent to the end user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to manage access to a resource, comprising:
a communication interface configured to receive from a mobile device a request to access a resource at a cloud service; and
one or more processors coupled to the communication interface and configured to:
in response to receipt of the request being generated by an unmanaged application running on the mobile device, cause a device level virtual private network (VPN) connection to be established to the mobile device on which application-level traffic is received;
cause the application-level traffic received via the device level VPN to be tagged with a tag comprising a unique identifier associated with the device level VPN;
receive, via the communication interface, authentication traffic from a managed application mediating access to the cloud service;
determine whether the authentication traffic includes the tag;
based at least in part on a determination that the authentication traffic includes the tag, determine that the authentication traffic is received from the mobile device; and
in response to a determination that the authentication traffic is received from the mobile device, allow the mobile device access to the resource.

2. The system of claim 1, wherein:
the causing the device level VPN connection to be established to the mobile device includes sending a notification to the mobile device in response to the receipt of the request; and
the notification is configured to cause the mobile device to invoke establishment of the device level VPN.

3. The system of claim 2, wherein the notification comprises a push notification to a trusted application on the mobile device.

4. The system of claim 1, wherein:
the causing the device level VPN connection to be established to the mobile device includes causing the managed application on the mobile device to receive traffic from multiple other applications on the mobile device; and
the managed application corresponds to the device level VPN.

5. The system of claim 1, wherein the request is generated by the unmanaged app in response to an access redirection from a cloud service provider in connection with an authentication of the mobile device.

6. The system of claim 1, wherein the device level VPN causes traffic from multiple applications on the mobile device to be routed via the device level VPN.

7. The system of claim 1, wherein the device level VPN connection to the mobile device is established in response to determining that a security posture of the mobile device indicates that the mobile device is secure.

8. The system of claim 1, wherein the device level VPN connection to the mobile device is established in response to determining that a trusted application on the mobile device indicates that the mobile device is secure.

9. The system of claim 8, wherein the one or more processors are further configured to prevent establishment of the device level VPN connection in response to a determination that the trusted application indicates that the mobile device is not secure.

10. The system of claim 8, wherein the trusted application comprises an authenticator application associated with a multi-factor authentication solution.

11. The system of claim 8, wherein the trusted application has a secure connection on the mobile device to a mobile application management (MAM) application or agent.

12. The system of claim 11, wherein the secure connection is provided via an application containerization solution.

13. The system of claim 1, wherein the one or more processors are further configured to:
determine a security posture of the mobile device; and
deny access to the resource based at least in part on a determination that the mobile device is not in a secure state.

14. The system of claim 1, wherein the authentication traffic is communicated in response to the mobile device attempting to access the cloud service.

15. The system of claim 1, wherein the unmanaged application comprises an application associated with the service provider.

16. A method to manage access to a resource, comprising:
receiving, via a communication interface, from a mobile device a request to access a resource at a cloud service;
in response to receipt of the request being generated by an unmanaged application running on the mobile device, causing a device level virtual private network (VPN) connection to be established to the mobile device on which application-level traffic is received;
causing the application-level traffic received via the device level VPN to be tagged with a tag comprising a unique identifier associated with the device level VPN;
receiving, via the communication interface, authentication traffic from a managed application mediating access to the cloud service;
determining whether the authentication traffic includes the tag;
based at least in part on a determination that the authentication traffic includes the tag, further determining that the authentication traffic is received from the mobile device; and
in response to a determination that the authentication traffic is received from the mobile device, allowing the mobile device access to the resource.

17. A computer program product to manage access to a resource, the computer program product being embodied in a non-transitory computer readable medium and comprising computer instructions that, when executed by one or more processors, cause the processors to:
receiving, via a communication interface, from a mobile device a request to access a resource at a cloud service;
in response to receipt of the request being generated by an unmanaged application running on the mobile device, causing a device level virtual private network (VPN) connection to be established to the mobile device on which application-level traffic is received;
causing the application-level traffic received via the device level VPN to be tagged with a tag comprising a unique identifier associated with the device level VPN;
receiving, via the communication interface, authentication traffic from a managed application mediating access to the cloud service;
determining whether the authentication traffic includes the tag;
based at least in part on a determination that the authentication traffic includes the tag, further determining that the authentication traffic is received from the mobile device; and
in response to a determination that the authentication traffic is received from the mobile device, allowing the mobile device access to the resource.

18. The system of claim 1, wherein the unique identifier is specific to the mobile device.

19. The system of claim 1, wherein the one or more processors are further configured to:
in response to receiving the request to access the resource from the mobile device, determine that the request is generated by the unmanaged application.

20. The system of claim 1, wherein allowing the mobile device access to the resource includes:
allowing the unmanaged application to communicate with the cloud service in connection with accessing the resource.

21. The system of claim 1, wherein the one or more processors are further configured to:
compare the tag associated with authentication traffic with the tag associated with application-level traffic;
in response to determining that the tag associated with authentication traffic matches the tag associated with application-level traffic, deeming the authentication traffic to be received from the mobile device.

* * * * *